US009881095B2

(12) United States Patent
Lee et al.

(10) Patent No.: US 9,881,095 B2
(45) Date of Patent: Jan. 30, 2018

(54) SEARCH RESULTS FOR NATIVE APPLICATIONS

(71) Applicant: Google Inc., Mountain View, CA (US)

(72) Inventors: Dong Ha Lee, Palo Alto, CA (US); Jaehyun Yeom, Mountain View, CA (US)

(73) Assignee: Google LLC, Mountain View, CA (US)

( * ) Notice: Subject to any disclaimer, the term of this patent is extended or adjusted under 35 U.S.C. 154(b) by 332 days.

(21) Appl. No.: 14/747,804

(22) Filed: Jun. 23, 2015

(65) Prior Publication Data

US 2015/0370812 A1 Dec. 24, 2015

Related U.S. Application Data

(60) Provisional application No. 62/016,645, filed on Jun. 24, 2014.

(51) Int. Cl.
G06F 17/30 (2006.01)
H04L 29/08 (2006.01)

(52) U.S. Cl.
CPC .... G06F 17/3087 (2013.01); G06F 17/30864 (2013.01); H04L 67/10 (2013.01)

(58) Field of Classification Search
CPC .. G06F 17/3087; G06F 17/30864; G06F 8/61; G06F 8/65; G06F 8/66; H04L 67/10
(Continued)

(56) References Cited

U.S. PATENT DOCUMENTS 7,617,225 B2 11/2009 Arrouye
8,086,957 B2 12/2011 Bauchot
(Continued)

FOREIGN PATENT DOCUMENTS

| EP | 2474905 | 7/2012 |
|---|---|---|
| EP | 2495670 | 9/2012 |
| EP | 2610776 | 7/2013 |

OTHER PUBLICATIONS

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.
(Continued)

*Primary Examiner* — Greta Robinson
(74) *Attorney, Agent, or Firm* — Fish & Richardson P.C.

(57) ABSTRACT

Methods, systems, and apparatus, including computer programs encoded on a computer storage medium, for generating native application search results. In one aspect, a method includes accessing application package files for native applications, and for each native application: determining, from the application package file, an application name of the native application, accessing, at the data processing apparatus, application pages of the native application, and for each of the application pages, generating application page data describing content of the application page, an application page name of the application page, the content described by the application page data including text that a user device displays on the application page when the user device displays the application page, and indexing the application page data and application icon for the native application in an index that is searchable by a search engine.

13 Claims, 3 Drawing Sheets

(58) Field of Classification Search
USPC ....... 707/705, 706, 709, 711, 715, 741, 802, 707/830
See application file for complete search history.

(56) References Cited

U.S. PATENT DOCUMENTS

| | | | |
|---|---|---|---|
| 8,458,384 | B2 | 6/2013 | Johnson |
| 8,510,764 | B1 | 8/2013 | Deselaers |
| 8,515,979 | B2 | 8/2013 | Mehta |
| 8,554,345 | B2 | 10/2013 | Fernandez |
| 8,595,450 | B2 | 11/2013 | Nguyen |
| 8,756,432 | B1* | 6/2014 | Chen ................. G06F 21/51 713/187 |
| 9,002,821 | B2* | 4/2015 | Chang ............ G06F 17/30864 707/711 |
| 9,524,347 | B1* | 12/2016 | Jung ............... G06F 17/30867 |
| 2004/0030882 | A1 | 2/2004 | Forman |
| 2007/0209080 | A1 | 9/2007 | Ture |
| 2010/0257466 | A1 | 10/2010 | Wroblewski |
| 2010/0306191 | A1 | 12/2010 | LeBeau |
| 2011/0252038 | A1 | 10/2011 | Schmidt |
| 2011/0314004 | A1 | 12/2011 | Mehta |
| 2012/0124061 | A1 | 5/2012 | MacBeth et al. |
| 2012/0179706 | A1 | 7/2012 | Hobbs |
| 2012/0179955 | A1 | 7/2012 | French |
| 2012/0290584 | A1 | 11/2012 | De |
| 2012/0316955 | A1 | 12/2012 | Panguluri et al. |
| 2012/0323898 | A1 | 12/2012 | Kumar |
| 2013/0006897 | A1 | 1/2013 | Jain |
| 2013/0047149 | A1* | 2/2013 | Xu ..................... G06F 8/61 717/175 |
| 2013/0110815 | A1 | 5/2013 | Tankovich |
| 2013/0111328 | A1 | 5/2013 | Khanna |
| 2013/0122861 | A1 | 5/2013 | Kim |
| 2013/0124606 | A1 | 5/2013 | Carpenter |
| 2013/0191360 | A1 | 7/2013 | Bullard |
| 2013/0232256 | A1 | 9/2013 | Lee |
| 2013/0298007 | A1 | 11/2013 | Cullen |
| 2013/0325856 | A1 | 12/2013 | Soto |
| 2014/0032759 | A1* | 1/2014 | Barton ................. H04L 67/10 709/225 |
| 2014/0040231 | A1* | 2/2014 | Lin .................. G06F 17/30867 707/708 |
| 2014/0108913 | A1* | 4/2014 | Bourke ............ G06F 17/30893 715/234 |
| 2014/0172412 | A1 | 6/2014 | Viegas et al. |
| 2014/0250147 | A1* | 9/2014 | Shapira ............ G06F 17/30864 707/770 |

OTHER PUBLICATIONS

"App Linking," [online][Retrieved on Jan. 7, 2014]; Retrieved from the Internet URL: https://developers.facebook.com/docs/android/link-to-your-native-app/; 14 pages.

"Class Gecko View Content," [online] [Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through a "Web" of Apps," [online] [Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online] [Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online][Retrieved on Dec. 13, 2013]; Retrieved from the Internet URL: techcrunch.com/2013/10/31/android-4-4-kitkat-app-index-ing/; 6 pages.

"How to detelmine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online][Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online][Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online][Retrieved on Dec. 16, 2013]; Retrieved from the Internet URL: chrome.blogspot.jp/2011/08/instant-pages-on-google-chrome.html; 3 pages.

"Mobile deep linking," [online][Retrieved on Dec. 13, 2013]; Retrieved from the Internet URL: en.wikipedia.org/wiki/Mobile_deep_linking; 2 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for a "Web" of Apps? Quixey Launches AppURL, A New Way to Enable Deep Linking Across Mobile Applications," [online][Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

International Search Report and Written Opinion in International Application No. PCT/US2015/037111, dated Sep. 8, 2015, 9 pages.

* cited by examiner

SEARCH RESULTS FOR NATIVE APPLICATIONS

CLAIM OF PRIORITY

This application claims priority under 35 USC §119(e) to U.S. Patent Application Ser. No. 62/016,645, filed on Jun. 24, 2014, the entire contents of which are hereby incorporated by reference.

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

A variety of search engines are available for identifying particular resources accessible over the Internet. These search engines crawl and index the various web page resources. The search engine then uses the index to determine which resources are most responsive to a search query and provides search results that link to the resources in response to the query.

With the advent of tablet computers and smart phones, native applications that facilitate the performance of the same functions facilitated by the use of web page resources are now being provided in large numbers. Search engines, however, do not crawl or index information from within a native application environment. Instead, metadata regarding the native application are indexed and then accessed when processing search queries.

SUMMARY

The present disclosure relates to app deep linking, and more specifically to systems and methods for deep link processing to automatically generate and provide a concise and accurate deep link identifying string.

In general, one innovative aspect of the subject matter described in this specification can be embodied in methods that include the actions of accessing application package files for native applications, and for each native application: determining, from the application package file, an application name of the native application, accessing, at the data processing apparatus, application pages of the native application, and for each of the application pages, generating application page data describing content of the application page, an application page name of the application page, the content described by the application page data including text that a user device displays on the application page when the user device displays the application page, and indexing the application page data and application icon for the native application in an index that is searchable by a search engine. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The information stored in the application page index of native application pages is taken from actual application page data and the application package, and may thus provide a more comprehensive description of application content than is provided by other data that describes the native application but is not otherwise part of the native application package.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
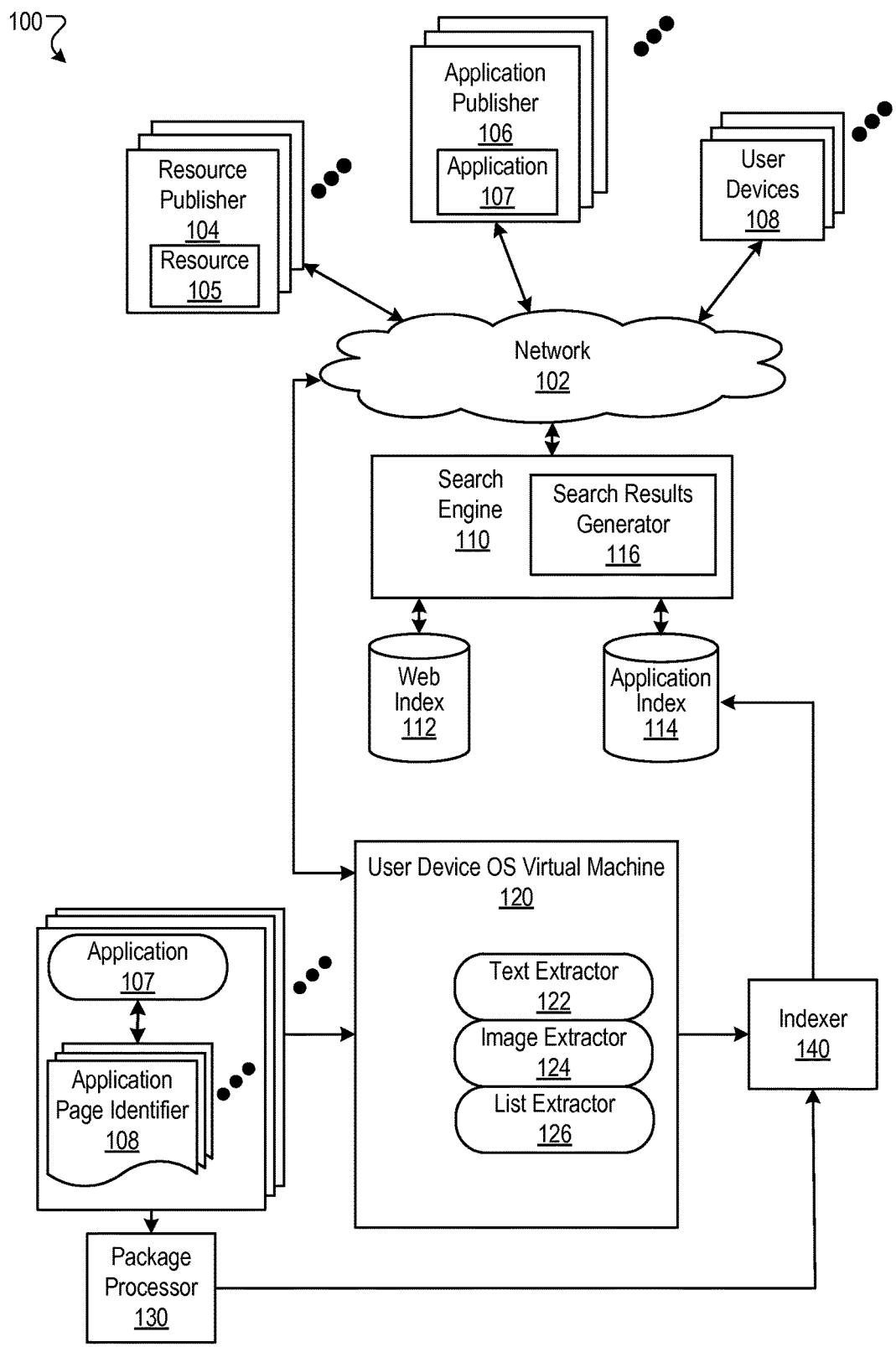
FIG. 1 is a block diagram of an example environment in which application pages for native applications are indexed, searched, and identified by native application search results.

Internet search engines provide the ability to search an indexed collection of web pages that exist on the Internet. The typical search engine provides, in response to a query, a list of results relevant to the query, often with hyperlinks allowing a user to quickly navigate to a result of interest. A user may select a linked result and thereby be provided with a web page(s) containing content about a celebrity, product, business, etc. The links may be to a site's "home page" (e.g., a welcome and search page for a site aggregating cooking information such as recipes) or may be a "content page" that a user can access when navigating from a site's home page (e.g., a specific recipe at the cooking information site). Links to content pages, as opposed to home pages, are referred to as "deep links" (and the process for crawling, indexing, and serving these content pages is similarly referred to as "deep linking").

The ability to navigate to a page, as well as the accessibility of content and functionality that that page provides, is dictated in part by the nature of the published page. For example, certain pages may contain dynamic content (e.g., asynchronous java script and XML (AJAX), Adobe Flash, etc.) that are difficult or impossible to crawl and retrieve. Consequently, these pages may not be available in response to a search, a user may not be able to save the page as a bookmark or the like, and page navigation via browser controls (e.g., forward and back in history) may not operate as intended.

In certain instances, a search for documents may currently be performed "within an app" or for content specific to an app (i.e., a native application). For instance, when properly configured to process a uniform resource identifier (URI), a browser may launch a native application and present to a user a specific content page within the native application.

A typical search engine can develop a string of identifying text that assists a user in determining relevance of an individual search result. This is the text often presented to a user in bold, underlined, and often in a highlighting color, to indicate what the linked to content is about. This is similar to anchor text, although that term often is associated with text a user assigns to a link, whereas the search result text is text identified and assembled by the search engine to provide some indication as to the content of the target page. In certain implementations, search engines can use a document title, phrases containing the search string, and other cues from a search result document to generate an identifying string for a search result.

One problem with native application deep linking is that the target of the link may not include text or other resources that would allow a browser to generate an identifying string for the link. Another problem is that an identifying string may not, itself, provide a clue as to the native application from which the link is obtained (and needed for opening of the link). Accordingly, it has not been possible to build a useful search results page for native application deep linking search results.

Some attempts to create identifying strings for search results have used meta-data from the application market. However, strings obtained in this way are often too long, contain repetitive and/or extraneous details, are not sufficiently clear, and otherwise cannot be used.

A system provides native application search results. As used herein, a native application operates independent of a browser application on the user device. A native application is an application specifically designed to run on a particular user device operating system and machine firmware and not within a browser. Native applications thus differ from browsers, browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific as are native applications. Furthermore, as used herein, a native application search result is a search result that corresponds to a particular native application and that, when selected, invokes the particular native application.

To index data for a native application, the system, in some implementations, instantiates a virtual machine that emulates an operating system operating on a user device. Within the virtual machine, the system instantiates a native application specific to the operation system. The native application generates application pages for display on a user device within the native application, and operates independent of a browser application on a user device.

The system accesses, within the virtual machine, application pages of the native application. The system can access the pages by an automated process that explores various menus and selection options for each application page and each subsequent application page. Alternatively, the system can access the pages that are specified by a publisher of the native application.

For each of the application pages, the system generates application page data describing content of the application page and an application page title. The content described by the application page data may, for example, include: text that a user device displays on the application page when the user device displays the application page, including title text; image data that defines an image of the application page as would be rendered in the native application; listing/menu data that describes various lists and menus of the application page; and other data that describes other features of the application page.

The system also accesses the application package for the native application. The application package is, in some implementations, a collection of files that are used to distribute and install the native application software and middleware on a device. The system decompresses and interprets the application package file, identifies application icons for the native application, identifies for each application icon a text string which shows below the application icon when the application is installed. For some applications, multiple strings exist such as based on locale (county and language); each can be indexed and associated with a corresponding luggage. The names defined by the text strings are referred to herein as "application display names." The application icons, text strings and other data collected from the application package are also indexed as part of the application page data.

Generating a native application search result may involve building the result title as a combined string of the "page title" and the "application display name." The application icon may also be added to the title for a native application search result. Variations of order and content can also be used, such as icon+[page title]+"–"+[app display name]; or 2-line-size icon+[page title]+":"+[app display name], date of search, date of capture of dynamic content;

and so on.

In summary, the present disclosure provides a method for obtaining search results for a native application deep link search in which each result is concisely and accurately represented by an identifying string including a title (app identifier), a snippet of text (page title), and a link to the content. Additional details such as an icon for the relevant app may also be provided.

Operation of the system that indexes application page data and the processing of search results for application pages is described in more detail below.

FIG. 1 is a block diagram of an example environment 100 in which application pages for native applications are indexed and searched. A computer network 102, such as the Internet, connects resource publisher web sites 104, application publishers 106, user devices 108 and a search engine 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware. As used in this specification, an "application page" is a particular display environment within a native application and in which is displayed content, such as text, images, and the like. An application page is specific to the particular native application, and the native application is specific to the particular operating system of the user device 108. An application page differs from a rendered web resource in that the application page is generated within and specific to the native application, while a web resource may be rendered in any browser for which the web page resource is compatible, and is independent of the operating system of the user device.

A user device 108 is typically capable of requesting and receiving web page resources 105 and native applications 107 over the network 102. Example user devices 108 include personal computers, mobile communication devices, and tablet computers.

To search web resources 105 and the native applications 107, the search engine 110 accesses a web index 112 and an application index 114. The web index 112 is an index of web resources 105 that has, for example, been built from crawling the publisher web sites 104. The application index 114 is an index of application pages for native applications 107, and is constructed using a virtual machine 120 and an indexing process that is described in more detail below. Although shown as separate indexes, the web index 112 and the application index 114 can be combined in a single index.

The user devices 108 submit search queries to the search engine 110. In response to each query, the search engine 110 accesses the web index 112 and the application index 114 to identify content that is relevant to the query. The search engine 110 may, for example, identify the resources and applications in the form of web resource search results and native application search results, respectively, by use of a search result generator 116. Once generated, the search results are provided to the user device 108 from which the query was received.

A web resource search result is data generated by the search engine 110 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114 and the web index 112, as described in more detail below. When selected at a user device, the native application search result causes the native application installed on the user device to request the synchronized content. Once the native application receives the requested content, the native application displays the content in a user interface of the native application. Such a function is referred to as "deep linking" within the application search result.

Figure 2:
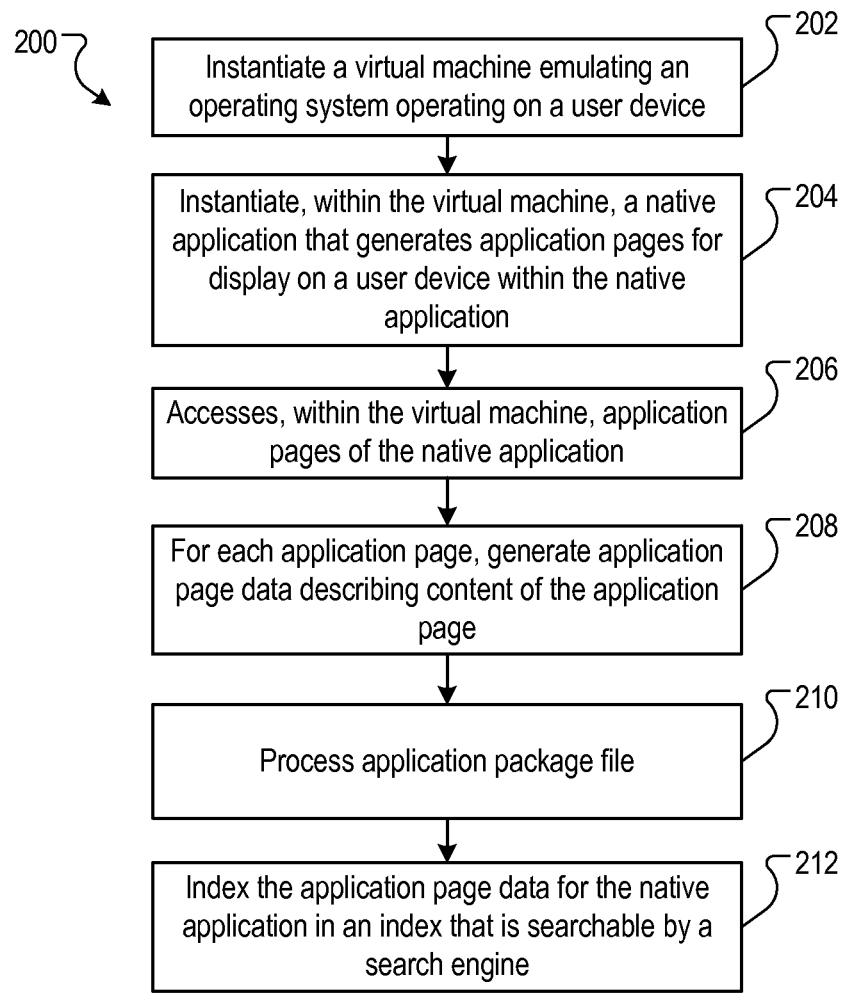
FIG. 2 is a flow diagram of an example process for indexing application page data of native applications.

The collection of application page data and application package data for the application index is described with reference to FIG. 1 and with further reference to FIG. 2, which is a flow diagram of an example process 200 for indexing application page data of native applications. The process 200 can be implemented in a data processing apparatus of one or more computers in data communication. The process is described as using a virtual machine for gathering some of the application page data, but the processes and devices can also be used.

The process 200 instantiates a virtual machine 120 emulating an operating system for a user device (202). The virtual machine 120 may, in some implementations, be a modified version of the operating system and includes extractors that extract data from application pages as described in more detail below.

The process 200 instantiates, within the virtual machine 120, a native application 107 that generates application pages for display on a user device within the native application 107. For example, the virtual machine 120 may, for each application in a set of native applications 107 to be processed, launch an instance of the native application 107.

The process 200 accesses, within the virtual machine 120, application pages of the native application (206). In some implementations, the virtual machine accesses the pages by an automated process that explores various menus and selection options for each application page and each subsequent application page. Such an automated process can be accomplished by sequentially selecting menu options and links according to a deterministic routine that results in the selection of each application page provided by the native application 107. Alternatively, the virtual machine 120 can access the application pages that are specified by a publisher of the native application. For example, an application publisher may provide a list of application page identifiers 108 in the form of uniform resource identifiers (URIs) that the publisher desires to be crawled and indexed in the application index 114, and only those application pages referenced by the URIs for the particular native application 107 are accessed and indexed.

For each application page, the process 200 generates application page data describing content of the application page (208). The content of the page may include, for example, text displayed on the application page; images displayed on the application page; links on the application page to other application pages or other web resources; and other content that is appropriate for indexing.

In some implementations, the virtual machine 120 includes extractors that extract content data for indexing. The extracted content data is, for example, data that is provided to a rendering process of the native application. The rendering process renders content based on the data for display on a user device. Use of extractors allows for more accurate identification of the various content of an application page. For example, the text extractor 122 extracts text data provided to a rendering process of the native application. The text data specifies the text that is to be rendered in the application page. The text may be formatted, labeled or otherwise distinguishable as title text, header text, article content, and the like. Thus, rather than processing an image of the application page, or processing binary data of the display, the virtual machine 120 receives the actual text that is to be rendered in the environment of the native application 107.

Other extractors can likewise be used, such as an image extractor 124 and a list extractor 126. The image extractor 124 provides image data of an image that is to be rendered in the environment of the native application 107, and the list extractor 126 provides list data of a list of scrollable items that is rendered in the environment of the native application 107. Other data can also be extracted, such as application page link data describing links within the application page that link to another application page; web page link data describing links within the application page that link to a web resource referenced by a uniform resource locator and that, when selected, instantiate a browser application that renders the resource in a browser environment separate from the native application; etc.

The extractors 122, 124 and 126, and other appropriate data extractors, can be implemented using appropriate data handlers for a particular operating system. For example, for the Android™ operating system, the extractors 122, 124 and 126 may be implemented using TextView objects, ImageView objects, and ListView objects, respectively. The virtual machine 120 processes the objects to extract the corresponding data, e.g., by including instructions that cause the virtual machine to store for indexing the corresponding data that is provided for rendering.

The process 200 processes the application package file (210). For example, a package processor 130, such as a computer device configured to decompress and analyze the application package, can process the application package. Alternatively, the virtual machine 120 can process the application package. A variety of native application related data can be collected and indexed from the application package file. For example, an application icon is identified, such as the icon that is displayed when an application is installed. A text string that displays below the icon is identified, and the application display name is set to this text string. The application display name may be different than the actual application name.

When multiple text strings are found, and each relates to a particular language (or locale), the language or locale is associated with the text string. The language or locale can be used to select a text string based on a language or locale associated with a query when generating a native application search result for the query.

Other information from the application package file can be detected and stored in the index. For example, a listing of files in the application package can be generated; file sizes, version levels, and other descriptive data can also be detected.

The process 200 indexes the application page data for the native application in an index that is searchable by the search engine (212). For example, an indexer 140 indexes, for each application page URI and native application 107 identifier, the application page data describing the content for the application page. The indexed data are stored in the application index 114. A variety of appropriate indexing processes can be used to index the data. For example, the application index 114 can include, for each native application 107 and URI pair, a row of data describing the application page data. The particular database and indexing scheme used may, for example, depend on the search engine algorithms utilized within the search engine.

In some situations, a particular native application page may have different URIs that correspond to different content. For example, a stock quote application may have a first portion of a URI that is the same for all stock quotes, and a second portion of the URI, such as a query parameter, that includes a name-value pair for a specific quote or quotes to be displayed on the application page. In some implementations, each specific instance of a unique URI constitutes an entry in the application index 114.

Figure 3:
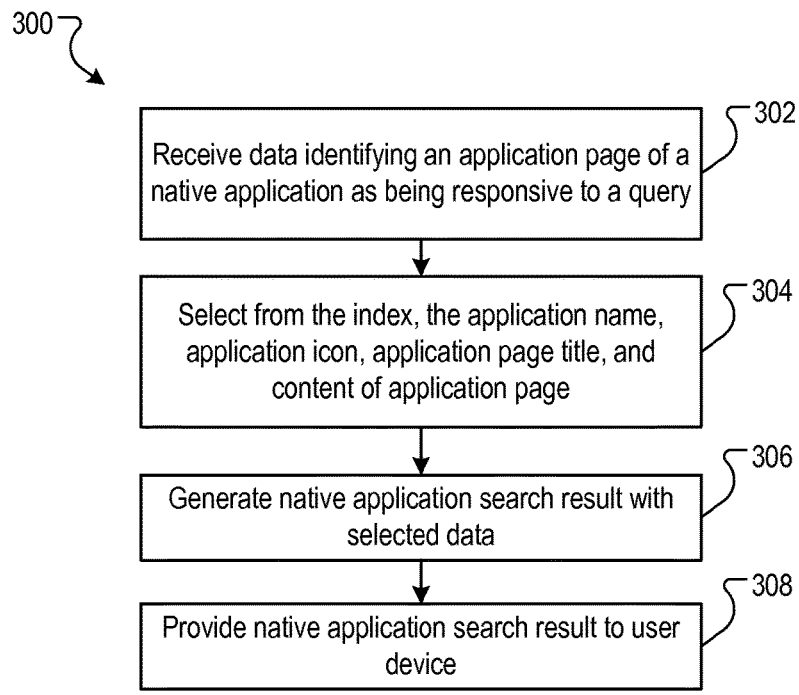
FIG. 3 is a flow diagram of an example process for generating a native application search result.

After the application index 114 is built, the search engine 110 can access the application index 114 to identify native applications that may be responsive to a query. In some implementations, the applications may be identified by native application search results. FIG. 3 is a flow diagram of an example process 300 for generating a native application search result, and is implemented in the search results generator 116 of the search engine 110.

The process 300 receives data identifying an application page of a native application as being responsive to a query (302). For example, the search engine 110 may provide data indicating that it determined a particular application page for a particular native application to be responsive to a query, and that a native application search result for the application page is to be generated. The data may reference a row or entry in the index 114 that contains the data for the native application page.

The process 300 selects, from the index, the application name, application icon, application page title, and content of the application page (304). For example, the search results generator, using data from the search engine, accesses the indexed application name, application icon, application page title, and content of the application page. The data selected may depend on the search query, and particular data that may be specified by the search engine 110.

Figure 4:
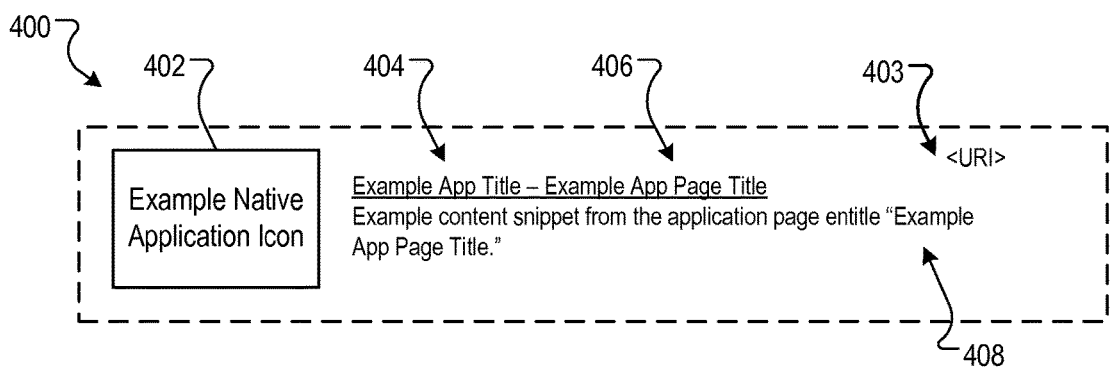
FIG. 4 is an illustration of a native application search result.

The process 300 generates a native application search result with selected data (306). For example, FIG. 4 is an illustration of a native application search result 400 generated by the process 300. As evidence in FIG. 4, the search results generator included the application icon 402 for the native application as a first image descriptor in the native application search result 400. Other images could also be selected, e.g., such as a thumbnail of a screen shot, for example. The search result includes, for example, a URI 403 of the application page. The URI may be visible, or may be embedded in the search result 400.

Also included in an application display name 404 as a first textual descriptor in a native application search result 400. The application display name may be the name, for example, that is displayed with an icon 402 when the application is installed on a user device.

In some implementations, the application page name 406 of the application page name referenced by the URI 403 as a second textual descriptor in the native application search result. The application page name 406 can be concatenated or combined with the application display name 404, as shown in FIG. 4. Optionally, the display formatting the first textual descriptor and the second textual description can be different to emphasize the different descriptor types.

Other data, such as content 408 that is displayed on the application page data then the application page is displayed, can also be included as a third textual descriptor.

The process 300 provides the native application search result to the user device (308). Once received at the user device, the user device displays the native application search result 400 to the user. In some implementations, selection of the search result 400 causes the native application to launch and generate an instance of the application page that includes content that is relevant to the search query. For example, provided the native application Example App Title is installed on the user device, selecting the search result 400 causes the native application to launch and generate the application page that corresponds to the page title 406 and content 408.

While the example native application search result 400 includes an icon 402, application display name 404, and page title 406 not all of these elements need to be included in a native application search result.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
   accessing, for each of a plurality of native applications, a respective application package file for the native application, the respective application package file for each native application including a collection of files that are used to distribute and install the native application on a user device, and for each native application:
      determining, from one or more of the files of the application package file, an application name of the native application, the determining comprising
         determining an application icon for the native application from one or more of the files of the application package file;
      indexing the application icon for the native application in the index; and
      selecting, from one or more of the files of the application package file, a text string defining the application display name for the application icon as the application name;
   accessing, at the data processing apparatus, application pages of the native application, and for each of the application pages, generating application page data describing content of the application page, an application page name of the application page, the content described by the application page data including text that a user device displays on the application page when the user device displays the application page;
   indexing the application page data and the application name for the native application in an index that is searchable by a search engine.

2. The computer-implemented method of claim 1, further comprising:
   receiving data identifying an application page of a native application as being responsive to a query, and in response:
      selecting from the index the application name and including the application name as a first textual descriptor in a native application search result;
      selecting from the index the application icon for the native application and including the application icon as a first image descriptor in the native application search result;
      selecting from the index a uniform resource identifier (URI) of an application page for the native application and including the URI in the native application search result;
      selecting an application page name of the application page name referenced by the URI as a second textual descriptor in the native application search result; and
   providing the native application search result to a user device in response to the query.

3. The computer implemented method of claim 2, wherein selecting from the index the application name and including the application name as a first textual descriptor in a native application search result comprises:
   determining one of a plurality of languages corresponding to the query; and
   selecting from a plurality of application names, each in a different language for the native application, the application name that corresponds to the language corresponding to the query.

4. The computer implemented method of claim 2, further comprising:
   receiving, from a publisher of the native application, data specifying application pages to be indexed for the native application; and
   accessing application pages of the native application comprises accessing only the application pages that are specified to be indexed for the native application.

5. The computer-implemented method of claim 2, further comprising:
   formatting the first textual descriptor in a first display format;
   formatting the second textual descriptor in a second display format this is different from the first display format.

6. The computer-implemented method of claim 2, further comprising:
   selecting from the index content data of content that is displayed on the application page data when the application page is displayed; and
   including the content data as a third textual descriptor in the native application search result.

7. A system, comprising:
   a data processing apparatus; and
   software stored in non-transitory computer readable storage medium storing instructions executable by the data processing apparatus and that upon such execution cause the data processing apparatus to perform operations comprising:
   accessing, for each of a plurality of native applications, a respective application package file for the native application, the respective application package file for each native application including a collection of files that are used to distribute and install the native application on a user device, and for each native application:
      determining, from one or more of the files of the application package file, an application name of the native application, the determining comprising
         determining an application icon for the native application from one or more of the files of the application package file;

indexing the application icon for the native application in the index; and selecting, from one or more of the files of the application package file, a text string defining the application display name for the application icon as the application name;

accessing, at the data processing apparatus, application pages of the native application, and for each of the application pages, generating application page data describing content of the application page, an application page name of the application page, the content described by the application page data including text that a user device displays on the application page when the user device displays the application page;

indexing the application page data and the application name for the native application in an index that is searchable by a search engine.

8. The system of claim 7, the operations further comprising:

receiving data identifying an application page of a native application as being responsive to a query, and in response:

selecting from the index the application name and including the application name as a first textual descriptor in a native application search result;

selecting from the index the application icon for the native application and including the application icon as a first image descriptor in the native application search result;

selecting from the index a uniform resource identifier (URI) of an application page for the native application and including the URI in the native application search result;

selecting an application page name of the application page name referenced by the URI as a second textual descriptor in the native application search result; and providing the native application search result to a user device in response to the query.

9. The system of claim 8, wherein selecting from the index the application name and including the application name as a first textual descriptor in a native application search result comprises:

determining one of a plurality of languages corresponding to the query; and selecting from a plurality of application names, each in a different language for the native application, the application name that corresponds to the language corresponding to the query.

10. The system of claim 8, the operations further comprising:

receiving, from a publisher of the native application, data specifying application pages to be indexed for the native application; and accessing application pages of the native application comprises accessing only the application pages that are specified to be indexed for the native application.

11. The system of claim 8, the operations further comprising:

formatting the first textual descriptor in a first display format;

formatting the second textual descriptor in a second display format this is different from the first display format.

12. The system of claim 8, the operations further comprising:

selecting from the index content data of content that is displayed on the application page data when the application page is displayed; and including the content data as a third textual descriptor in the native application search result.

13. A non-transitory computer readable storage medium storing instructions executable by a data processing apparatus and that upon such execution cause the data processing apparatus to perform operations comprising:

accessing, for each of a plurality of native applications, a respective application package file for the native application, the respective application package file for each native application including a collection of files that are used to distribute and install the native application on a user device, and for each native application:

determining, from one or more of the files of the application package file, an application name of the native application, the determining comprising determining an application icon for the native application from one or more of the files of the application package file;

indexing the application icon for the native application in the index; and selecting, from one or more of the files of the application package file, a text string defining the application display name for the application icon as the application name;

accessing, at the data processing apparatus, application pages of the native application, and for each of the application pages, generating application page data describing content of the application page, an application page name of the application page, the content described by the application page data including text that a user device displays on the application page when the user device displays the application page;

indexing the application page data and the application name for the native application in an index that is searchable by a search engine.

* * * * *